(12) United States Patent
Nakano

(10) Patent No.: US 12,377,857 B2
(45) Date of Patent: Aug. 5, 2025

(54) OPTICAL APPARATUS, AND ON-VEHICLE SYSTEM AND MOVING APPARATUS INCLUDING THE SAME

(71) Applicant: CANON KABUSHIKI KAISHA, Tokyo (JP)

(72) Inventor: Masatsugu Nakano, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1050 days.

(21) Appl. No.: 17/381,801

(22) Filed: Jul. 21, 2021

(65) Prior Publication Data

US 2021/0354700 A1 Nov. 18, 2021

Related U.S. Application Data

(63) Continuation of application No. PCT/JP2020/001158, filed on Jan. 16, 2020.

(30) Foreign Application Priority Data

Jan. 30, 2019 (JP) .................................. 2019-013883

(51) Int. Cl.
*G01S 17/931* (2020.01)
*B60W 40/02* (2006.01)
(Continued)

(52) U.S. Cl.
CPC ........... *B60W 40/02* (2013.01); *G01S 7/4811* (2013.01); *G01S 17/931* (2020.01);
(Continued)

(58) Field of Classification Search
CPC ............ G02B 26/0816; G02B 26/0883; G02B 26/0891
See application file for complete search history.

(56) References Cited

U.S. PATENT DOCUMENTS

| 10,107,914 B2 | 10/2018 | Kalscheur |
| 2009/0201486 A1 | 8/2009 | Cramblitt |

(Continued)

FOREIGN PATENT DOCUMENTS

| CN | 108780214 A | 11/2018 |
| JP | 10 232305 A | 9/1998 |

(Continued)

*Primary Examiner* — Eric L Bolda
(74) *Attorney, Agent, or Firm* — Canon U.S.A., Inc. IP Division

(57) ABSTRACT

An optical apparatus includes a deflection unit configured to deflect illumination light from a light source to scan an object and deflect reflected light from the object, and a light guide unit configured to guide the illumination light from the light source to the deflection unit and guide the reflected light from the deflection unit to a light-receiving element, wherein the light guide unit includes a first surface on which the illumination light from the light source is incident and a second surface including a transmissive region through which the illumination light from the first surface is transmitted and a reflective region that reflects the reflected light from the deflection unit, wherein the first and the second surfaces are non-parallel to each other, and wherein the illumination light from the first surface is incident on the transmissive region without passing through other surfaces.

20 Claims, 12 Drawing Sheets

(51) Int. Cl.
     *G01S 7/481*        (2006.01)
     *G02B 26/08*       (2006.01)
     *G02B 26/10*       (2006.01)

(52) U.S. Cl.
     CPC ....... *G02B 26/0816* (2013.01); *G02B 26/101* (2013.01); *B60W 2554/802* (2020.02)

(56) References Cited

U.S. PATENT DOCUMENTS

| | | | |
|---|---|---|---|
| 2009/0296071 A1* | 12/2009 | Fukumoto | G01C 3/08 356/5.01 |
| 2010/0321669 A1* | 12/2010 | Yamada | G01C 15/002 356/4.01 |
| 2015/0268332 A1 | 9/2015 | Nakamura | |
| 2016/0245919 A1 | 8/2016 | Kalscheur | |

FOREIGN PATENT DOCUMENTS

| | | | |
|---|---|---|---|
| JP | 2012068350 A | 4/2012 |
| JP | 2012247255 A | 12/2012 |
| JP | 2017 075806 A | 4/2017 |
| WO | 2019012085 A1 | 1/2019 |

* cited by examiner

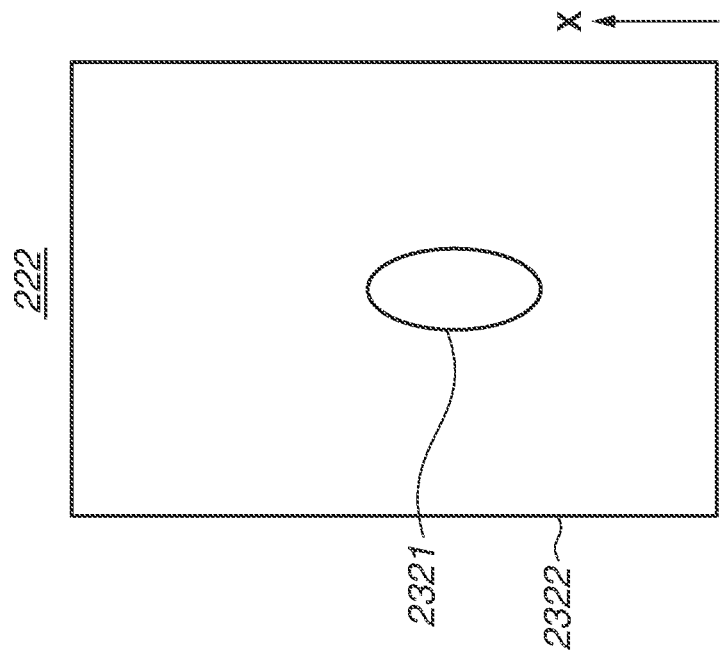
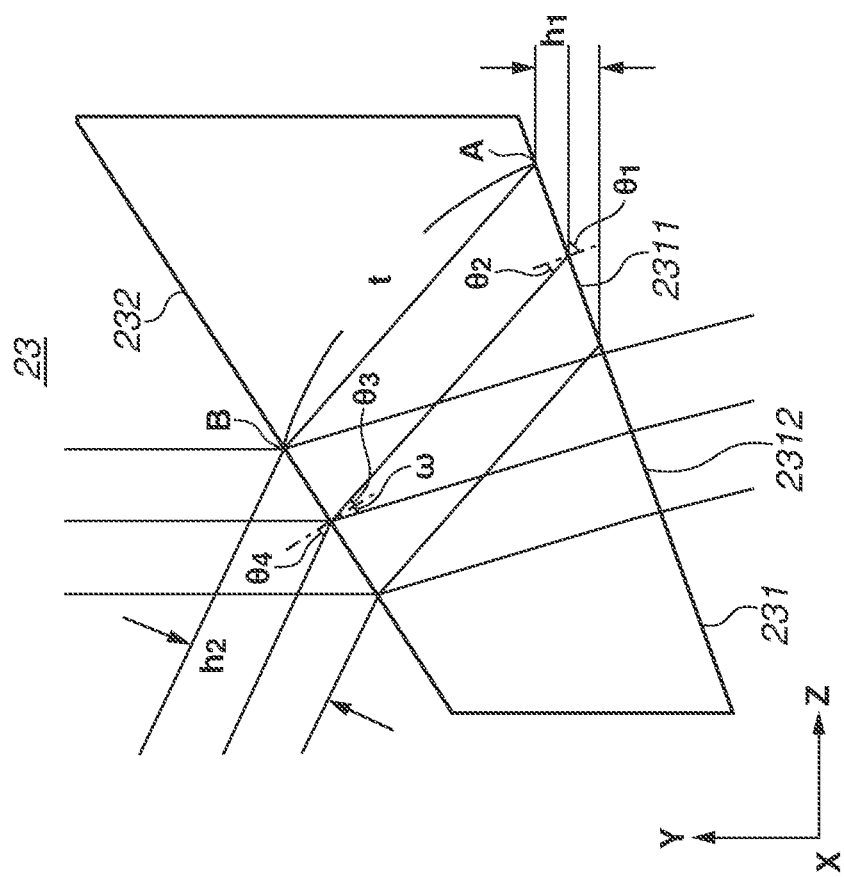
FIG.9

OPTICAL APPARATUS, AND ON-VEHICLE SYSTEM AND MOVING APPARATUS INCLUDING THE SAME

CROSS-REFERENCE TO RELATED APPLICATIONS

This application is a Continuation of International Patent Application No. PCT/JP2020/001158, filed Jan. 16, 2020, which claims the benefit of Japanese Patent Application No. 2019-013883, filed Jan. 30, 2019, both of which are hereby incorporated by reference herein in their entirety.

BACKGROUND OF THE INVENTION

Field of the Invention

The present invention relates to an optical apparatus that receives reflected light from an illuminated object to detect the object.

Background Art

A known distance measuring apparatus for measuring the distance to an object scans the object by deflecting illumination light from a light source via a deflection unit, and calculates the distance to the object based on the time until the reception of reflected light from the object and the phase of the reflected light.

Patent Document 1 discusses a distance measuring apparatus including a prism that reflects either one of illumination light and reflected light on the inner surface, and reflects the other thereof on the outer surface to guide the illumination light and the reflected light to a deflection unit and a light-receiving element, respectively.

CITATION LIST

Patent Literature

PTL 1: Japanese Patent Laid-Open No. 2012-68350

SUMMARY OF THE INVENTION

The spread angle of illumination light emitted from a general light source used in a distance measuring apparatus differs between the horizontal and vertical directions. Therefore, shaping of illumination light is required to obtain a favorable distance measurement accuracy. However, in a configuration discussed in Patent Document 1 in which illumination light is reflected by the outer surface of a prism, it is difficult to shape the illumination light by using the prism. Therefore, the use of other optical elements is required to shape the illumination light, resulting in an increased complication of the entire apparatus.

On the other hand, in a configuration discussed in Patent Document 1 in which illumination light is reflected by the inner surface of the prism, the illumination light can be shaped by using the prism. However, the illumination light passes through many optical surfaces of the prism. Therefore, part of the illumination light is scattered by scratches and foreign objects (sticking substances) on each optical surface of the prism, and the light is incident on a light-receiving element as unnecessary light. This increases the possibility of degradation of the distance measurement accuracy.

The present invention is directed to providing a simply configured optical apparatus capable of preventing the generation of unnecessary light.

To achieve the above-described purpose, according to an aspect of the present invention, an optical apparatus includes a deflection unit configured to deflect illumination light from a light source to scan an object and deflect reflected light from the object, and a guide unit configured to guide the illumination light from the light source to the deflection unit and guide the reflected light from the deflection unit to a light-receiving element, wherein the light guide unit includes a first surface on which the illumination light from the light source is incident and a second surface including a transmissive region through which the illumination light from the first surface is transmitted and a reflective region that reflects the reflected light from the deflection unit, wherein the first and the second surfaces are non-parallel to each other, and wherein the illumination light from the first surface is incident on the transmissive region without passing through other surfaces.

Further features of the present invention will become apparent from the following description of exemplary embodiments with reference to the attached drawings.

BRIEF DESCRIPTION OF THE DRAWINGS

FIG. 9 schematically illustrates a main portion of a light guide unit according to the third exemplary embodiment.

DESCRIPTION OF THE EMBODIMENTS

Figure 1:
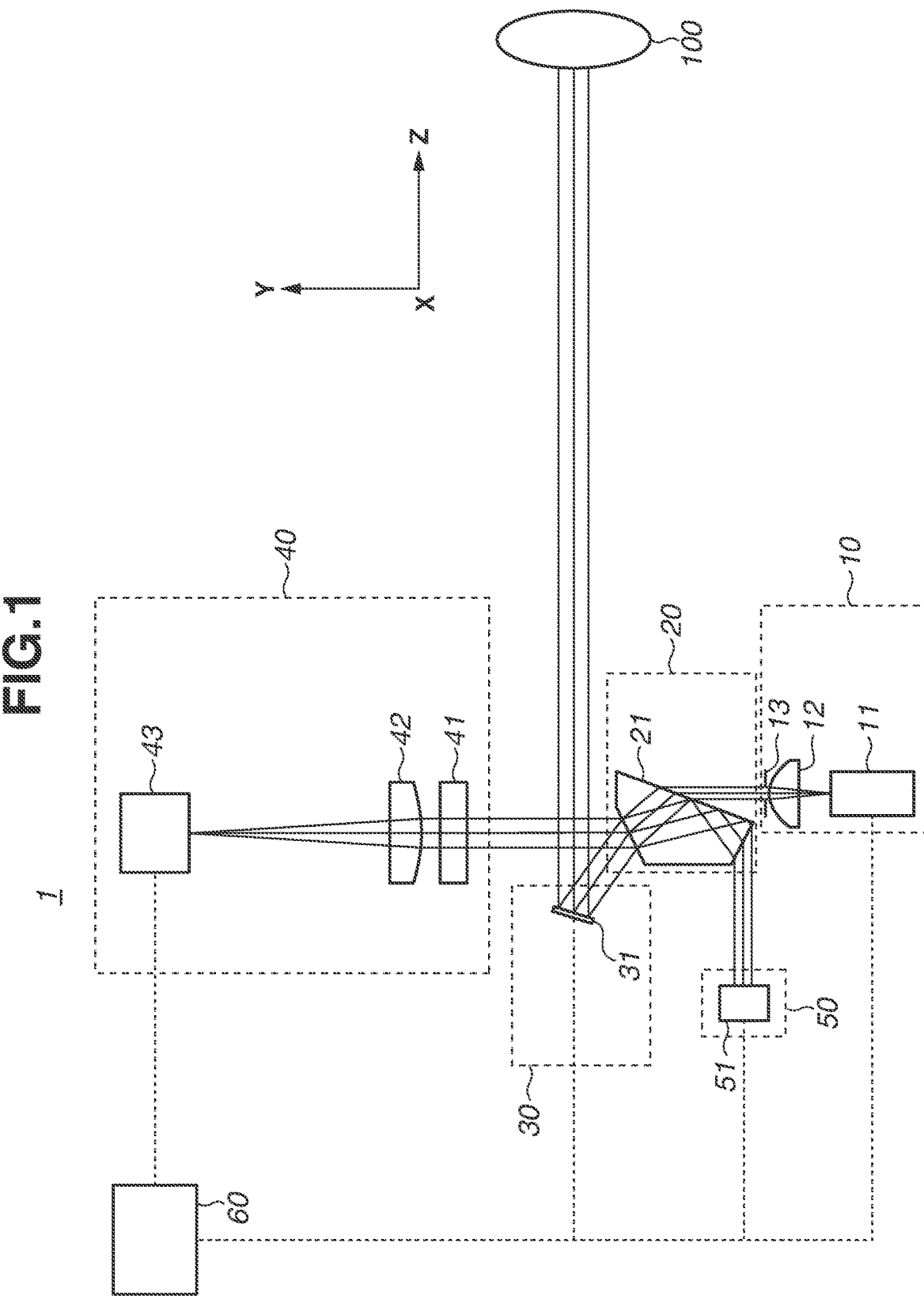
FIG. 1 schematically illustrates a main portion of an optical apparatus according to a first exemplary embodiment.

Preferred exemplary embodiments of the present invention will be described below with reference to the accompanying drawings. For descriptive purposes, each drawing may be illustrated in a scale different from the actual scale. In each drawing, identical members are assigned the same reference numerals, and redundant descriptions thereof will be omitted.

First Exemplary Embodiment

Figure 2:
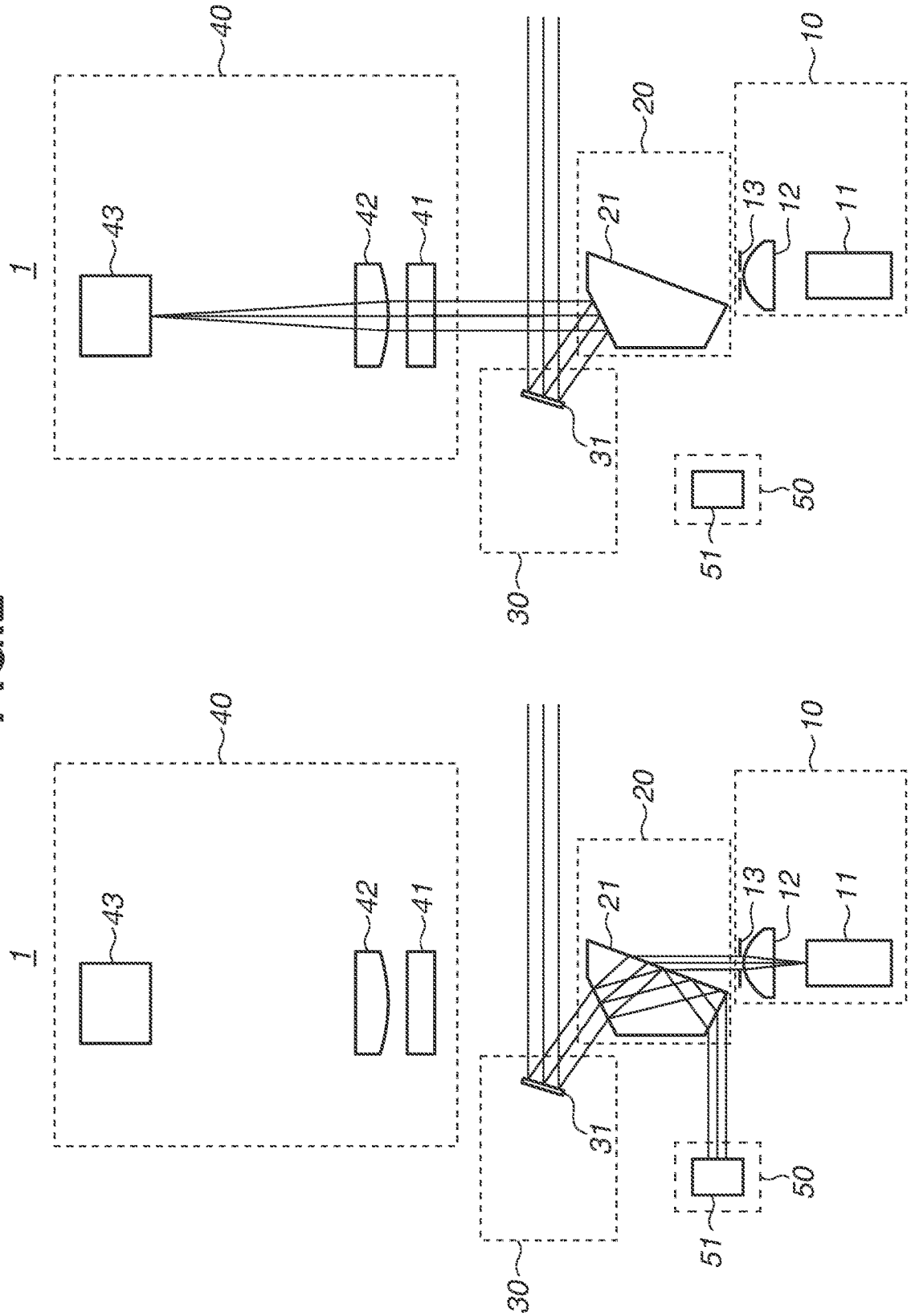
FIG. 2 illustrates optical paths of illumination light and reflected light in the optical apparatus according to the first exemplary embodiment.

FIG. 1 schematically illustrates a main portion of an optical apparatus 1, in a cross-section (YZ cross-section) including the optical axis, according to a first exemplary embodiment of the present invention. The optical apparatus 1 includes a light source unit 10, a light guide unit (branch unit) 20, a deflection unit 30, a light receiving unit (first light receiving unit) 40, a light receiving unit for light source (second light receiving unit) 50, and a control unit 60. FIG. 2 illustrates optical paths in the optical apparatus 1, including an optical path (illumination optical path) along which the illumination light from the light source unit 10 travels toward an object 100, and an optical path (light receiving optical path) along which the reflected light from the object 100 travels toward the light receiving unit 40.

The optical apparatus 1 receives the reflected light from the object 100 to serve as a detection apparatus (imaging apparatus) for detecting (capturing) the object 100 or as a distance measuring apparatus for acquiring the distance (distance information) to the object 100. The optical apparatus 1 according to the first exemplary embodiment employs a technique called Light Detection and Ranging (LiDAR) for calculating the distance to the object 100 based on the time until the reception of the reflected light from the object 100 and the phase of the reflected light.

The light source unit 10 includes a light source 11, an optical element 12, and a diaphragm 13. The light source 11 may be a semiconductor laser device having a high energy concentration and a high directivity. When applying the optical apparatus 1 to an on-vehicle system (described below), the object 100 may possibly include the human body. Therefore, it is desirable to employ, as the light source 11, a light source that emits infrared light having a small influence on the human eyes. The illumination light emitted by the light source 11 according to the present exemplary embodiment has a wavelength of 905 nm which is contained in the near-infrared region.

Figure 3:
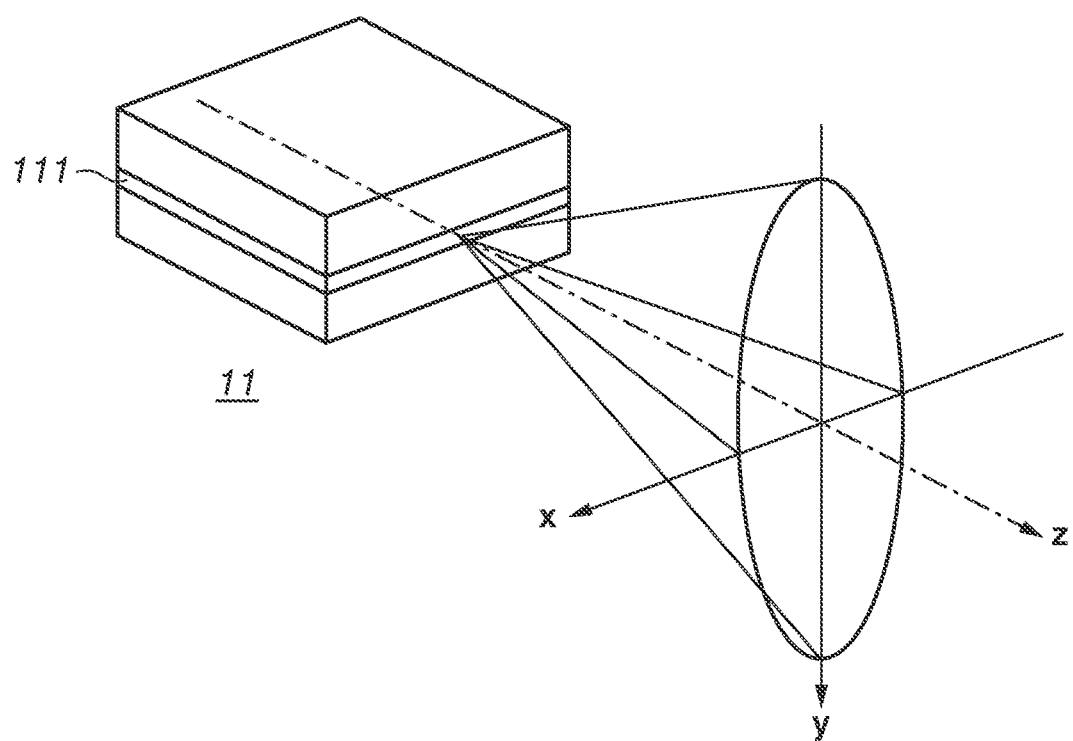
FIG. 3 schematically illustrates a general semiconductor laser device.

FIG. 3 schematically illustrates a general semiconductor laser device and a light beam emitted therefrom. As illustrated in FIG. 3, an active layer 111 of the semiconductor laser device as the light source 11 emits a divergent light beam having an elliptic shape in the xy cross-section parallel to the exit surface (light emitting surface) of the active layer 111. If the semiconductor laser 11 is of a linearly polarized light type, the polarization direction of the light beam (oscillation direction of the electric field) is a direction parallel to the upper and lower surfaces of the active layer 111, i.e., in a direction in the zx cross-section.

The optical element 12 has a function of changing the convergence of the illumination light emitted from the light source 11. The optical element 12 according to the present exemplary embodiment is a collimator lens (light condensing element) that converts (collimates) the divergent light beam emitted from the light source 11 into a parallel light beam. The parallel light beam in this case includes not only a strict parallel light beam but also an approximate parallel light beam such as a weak divergent light beam and a weak convergent light beam.

The diaphragm 13, which is a light-shielding member having an opening, determines the light beam diameter (light beam width) by limiting the illumination light from the optical element 12. The opening of the diaphragm 13 according to the present exemplary embodiment has an elliptic shape to match the shape of the illumination light. However, the opening shape is not limited thereto but may be other than an ellipse as required. The opening diameter of the diaphragm 13 according to the present exemplary embodiment is 1.60 mm in the X-axis direction (major axis direction) and 1.30 mm in the Z-axis direction (minor axis direction).

As illustrated in FIG. 2, the light guide unit 20 is a light guide member for branching an optical path into an illumination optical path and a light receiving optical path, guiding the illumination light from the light source unit 10 to the deflection unit 30, and guiding the reflected light from the deflection unit 30 to the light receiving unit 40. The light guide unit 20 according to the present exemplary embodiment includes a single branching optical element (prism) 21 made of a single material. Desirably, the material of the branching optical element 21 has a sufficiently high transmissivity with respect to the wavelength of the illumination light. More specifically, the material provides a refractive index of at least 1.70 with respect to a 905 nm wavelength. The material of the branching optical element 21 according to the present exemplary embodiment is TAFD55 from HOYA Corporation, having a refractive index of 1.972 with respect to a 905 nm wavelength.

Figure 4:
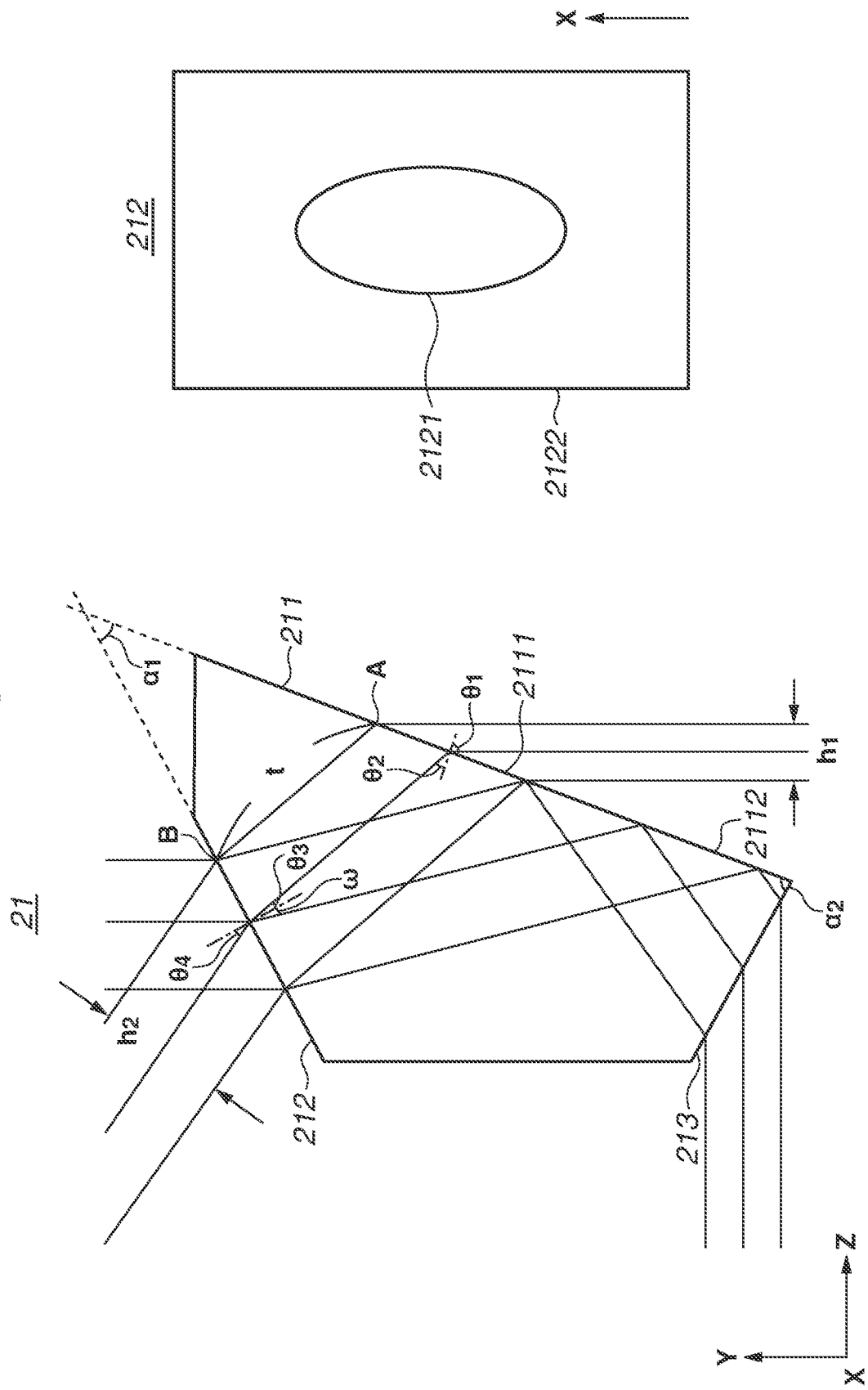
FIG. 4 schematically illustrates a main portion of a light guide unit according to the first exemplary embodiment.

FIG. 4 schematically illustrates a main portion of the branching optical element 21 according to the present exemplary embodiment. The branching optical element 21 has a plurality of optical surfaces (a first surface 211, a second surface 212, and a third surface 213) that transmit and reflect a light beam. FIG. 4 illustrates a cross-section (YZ cross-section) perpendicular to each optical surface of the branching optical element 21, and the second surface 212 thereof viewed from the normal direction. According to the present exemplary embodiment, in the YZ cross-section, an angle $\alpha_1$ formed by the first surface 211 and the second surface 212 is 41.9°, and an angle $\alpha_2$ formed by the first surface 211 and the third surface 213 is 81.8°.

The first surface 211 is an optical surface on which the illumination light from the light source unit 10 is incident. As described above, since the shape of the opening of the diaphragm 13 is an ellipse, the shape of a passage region (light incident region) 2111 that transmits the illumination light on the first surface 211 is also an ellipse. The first surface 211 includes a total reflection region 2112 in a region other than the passage region 2111 for transmitting the illumination light from the light source unit 10. The total reflection region 2112 totally reflects the light reflected by the second surface 212 to guide the light to the third surface 213. If necessary, there may be provided an antireflection film for reducing the reflectance to improve the transmissivity at the portion corresponding to the passage region 2111, and a reflection film at the portion corresponding to the total reflection region 2112.

The second surface 212 includes a transmissive region 2121 that transmits the illumination light from the first surface 211 and a reflective region 2122 that reflects the reflected light from the deflection unit 30. The transmissive region 2121 according to the present exemplary embodiment has an elliptic shape, the shape is not limited thereto. For example, if the light guide unit 20 shapes the illumination light so that its cross-section has a circular shape, the transmissive region 2121 may accordingly have a circular shape. The transmissive region 2121 may be provided with an antireflection film. The reflective region 2122 according to the present exemplary embodiment is provided with a reflection film (reflection layer) made of a metal or dielectric. It is desirable that the bottom portion (bottom layer) of the reflection film is provided with an absorption layer for absorbing the light from the inside of the branching optical element 21.

The illumination light that passed through the opening of the diaphragm 13 enters the branching optical element 21 from the first surface 211, penetrates the transmissive region 2121 on the second surface 212, and travels toward the deflection unit 30. As described above, the present exemplary embodiment is configured to allow the illumination light to enter the branching optical element 21 and then guide the light to the deflection unit 30. This makes it possible to shape the illumination light by the refractive action of the first surface 211 and the second surface 212. Thus, even if the spread angles (divergent angles) of the illumination light from the light source unit 10 are different between the X- and the Z-directions, the optical apparatus 1 can obtain a favorable distance measurement accuracy (detection accuracy).

The following assumes a case where, like the above-described Patent Document 1, the illumination light is reflected by the outer surface of the branching optical element and then is guided to the deflection unit. In this case, since the illumination light from the light source unit travels toward the deflection unit only through the outer surface of the branching optical element, the outer surface of the branching optical element needs to be made nonspherical (anamorphic) to shape the illumination light by using the branching optical element. In this configuration, however, the reflected light from the object is also incident on the outer surface of the branching optical element. Accordingly, the reflected light is affected by the aspheric surface action, resulting in a difficulty in obtaining a favorable distance measurement accuracy.

Alternatively, there is assumed a method for shaping the illumination light by disposing another optical element only in the illumination light path between the outer surface and the deflection unit. However, this increases the number of components in the optical apparatus, resulting in the increase in the complexity and size of the entire apparatus. Therefore, to obtain a favorable distance measurement accuracy while reducing the complexity and size of the optical apparatus, it is desirable to enable the illumination light to enter the branching optical element and have the illumination light guided to the deflection unit through a plurality of optical surfaces of the branching optical element, as is the case with the present exemplary embodiment.

In addition, the present exemplary embodiment is configured to directly guide the illumination light that has entered the branching optical element 21 from the first surface 211 to the transmissive region 2121 on the second surface 212 without using other surfaces. This configuration enables shaping the illumination light by using the minimum number of optical surfaces, i.e., the first surface 211 and the second surface 212, of the branching optical element 21. This enables reducing the possibility of the illumination light becoming partly scattered by scratches and foreign objects on each optical surface and turning into unnecessary light that enters the light receiving unit 40.

An on-vehicle system (described below) is required to detect, as the object 100, an object existing in a range between a short distance (approximately 1 m) from the optical apparatus 1 and a long distance (approximately 300 m) therefrom. However, the intensity of the reflected light (signal light) from the object 100 decreases with increasing distance from the optical apparatus 1 to the object 100. For example, if the distance from the optical apparatus 1 to the object 100 is increased by 10 times, the intensity of the reflection light received by the optical apparatus 1 decreases by approximately 1/100 times.

Therefore, when measuring the distance of the object 100 at the long distance, in particular, the above-described unnecessary light largely affects the distance measurement accuracy. For example, in a case where the ratio of the unnecessary light to the signal light received by the light receiving unit 40 increases, it becomes difficult to distinguish between the signal light and the unnecessary signal, largely decreasing the distance measurement accuracy. There is assumed a method for increasing the light quantity of the illumination light (the output of the light source 11) in accordance with the increase in the distance to the object 100. However, this method is not desirable because of the large influence of the object 100 on the human eyes.

On the other hand, the optical apparatus 1 having a simple configuration according to the present exemplary embodiment enables preventing the generation of unnecessary light without increasing the light quantity of the illumination light, thus achieving a favorable distance measurement accuracy. The optical apparatus 1 according to the present exemplary embodiment makes it possible to accurately acquire the distance information for the object 100 even when an infrared sensor having a lower sensitivity than a visible light sensor is used as the light receiving unit 40.

It is desirable that the branching optical element 21 is configured to change (vary) the diameter of the illumination light from the light source unit 10. According to the present exemplary embodiment, when the illumination light penetrates the first surface 211 and the second surface 212, the diameter of the illumination light in the YZ cross-section is enlarged by refraction. More specifically, in the YZ cross-section, the diameter of the illumination light emitted from the transmissive region 2121 is larger than the diameter of the illumination light incident on the first surface 211.

Since the spread angle of the illumination light can be reduced by increasing the diameter of the illumination light in this way, sufficient illuminance and resolution can be ensured even when the object 100 is far away. In the present exemplary embodiment, although only the light beam diameter in the YZ cross-section is enlarged to correspond to the elliptic shape of the illumination light from the light source unit 10, the present invention is not limited to this configuration. The light beam diameter in the YZ cross-section may be reduced, or the light beam diameter in a cross-section perpendicular to the YZ cross-section may be varied depending on the shape of the illumination light and the required detection information.

In the YZ cross-section, the illumination light that enters the first surface 211 has a diameter $h_1$ (diameter of the diaphragm 13) and the illumination light that exits the transmissive region 2121 has a diameter $h_2$ (diameter of the transmissive region 2121). Here, an incident angle of the illumination light incident on the first surface 211 is $\theta_1$ [°], a refraction angle of the illumination light refracted on the first surface 211 is $\theta_2$ [°], an incident angle of the illumination light incident on the transmissive region 2121 is $\theta_3$ [°], and a refraction angle of the illumination light refracted on the transmissive region 2121 is $\theta_4$ [°]. In this case, the relation represented by the following Formula (1) is satisfied based on Snell's law.

$$h_2/h_1 = (\cos \theta_2 * \cos \theta_4)/(\cos \theta_1 * \cos \theta_3) \quad (1)$$

The values on both sides of Formula (1) are larger than 1 in a case where the incident angle $\theta_1$ to the first surface 211 is larger than the refraction angle $\theta_4$ to the transmissive region 2121. This means that, when the values on both sides of Formula (1) are larger than 1, the diameter of the illumination light is enlarged by the branching optical element 21. According to the present exemplary embodiment, $h_1=1.30$ mm, $h_2=2.96$ mm, $\theta_1=69.4°$, $\theta_2=28.3°$, $\theta_3=13.5°$, and $\theta_4=27.5°$, and the values on both sides of formula (1) are 2.28, it can be seen that the illumination light has been enlarged.

The deflection unit 30 is a member for deflecting the illumination light from the light guide unit 20 to scan the object 100 and deflecting the reflected light from the object 100 to guide the reflected light to the light guide unit 20. The deflection unit 30 according to the present exemplary embodiment includes a single drive mirror (movable mirror) 31. It is desirable that the drive mirror 31 is swingable about at least two axes (2-axis drive mirror) to enable two-dimensional scanning of the object 100. For example, a galvanometer mirror or a Micro Electro Mechanical System (MEMS) mirror can be employed as the drive mirror 31. The drive mirror 31 according to the present exemplary embodiment is a MEMS mirror having a swinging angle of ±15° about the X- and the Y-axes and a swinging frequency of approximately 1 kHz.

The light receiving unit (light receiving unit for distance measurement) 40 includes an optical filter 41, an optical element 42, and a light-receiving element (light-receiving element for distance measurement) 43. The optical filter 41 is a member for transmitting only desired light and blocking (absorbing) other unnecessary light. The optical filter 41 according to the present exemplary embodiment is a bandpass filter for transmitting only the light in the wavelength band corresponding to the illumination light emitted from the light source 11. The optical element 42 is a condenser lens for condensing the light that passed through the optical filter 41 on the light receiving surface of the light-receiving element 43. The configurations of the optical filter 41 and the optical element 42 are not limited to those according to the present exemplary embodiment. For example, if necessary, the order of the arrangements of the two members may be changed, and a plurality of the respective members may be disposed.

The light-receiving element (first light-receiving element) 43 is an element (sensor) for receiving light from the optical element 42, photoelectrically converting the light into a signal, and outputting the signal. The light-receiving element 43 made of a photodiode (PD), an avalanche photodiode (APD), or a single photon avalanche diode (SPAD) can be employed. The reflected light from the object 100 illuminated by the illumination light is deflected by the deflection unit 30 and reflected by the reflective region 2122 of the branching optical element 21, and then enters the light-receiving element 43 via the optical filter 41 and the optical element 42.

Part of the illumination light from the first surface 211 does not penetrate but reflects off the transmissive region 2121. This reflection occurs regardless of the presence or absence of an antireflection film in the transmissive region 2121. The light reflected by the transmissive region 2121 totally reflects off the total reflection region 2112 on the first surface 211, exits the branching optical element 21 from the third surface 213, and then enters the light receiving unit for light source 50.

The light receiving unit for light source 50 includes a light-receiving element for light source (second light-receiving element) 51 for photoelectrically converting the illumination light from the light source 11 into a signal and outputting the signal. For example, a sensor similar to the light-receiving element 43 may be used as the light-receiving element for light source 51. If necessary, the light receiving unit for light source 50 may include an optical element (filter or lens) for guiding the light from the branching optical element 21 to the light receiving surface of the light-receiving element for light source 51.

The control unit 60 controls the light source 11, the drive mirror 31, the light-receiving element 43, and the light-receiving element for light source 51. The control unit 60 is, for example, a processing apparatus (processor) such as a central processing unit (CPU) or a calculation apparatus (computer) including the processing apparatus. The control unit 60 drives each of the light source 11 and the drive mirror 31 with a predetermined drive voltage and a predetermined drive frequency, and controls the output of the light source 11 (the light quantity of the illumination light) based on the signal from the light-receiving element for light source 51. The control unit 60 is capable of controlling, for example, the light source 11 to change the illumination light to pulsed light, and performing the intensity modulation on the illumination light to generate signal light.

The control unit 60 is also capable of acquiring the distance information for the object 100 based on the time period since the time (light emission time) when the illumination light is emitted from the light source 11 until the time (light reception time) when the light-receiving element 43 receives the reflected light from the object 100. In this case, the control unit 60 may acquire the signal from the light-receiving element 43 at a specific frequency. The control unit 60 may acquire the distance information based on the phase of the reflected light from the object 100 instead of the time until the reception of the reflected light from the object 100. More specifically, the control unit 60 may obtain the difference (phase difference) between the phase of the signal of the light source 11 and the phase of the signal output from the light-receiving element 43, and then multiply the phase difference by the velocity of light to acquire the distance information for the object 100.

The optical apparatus 1 serving as a LiDAR-based distance measuring apparatus identifies the object 100 such as a vehicle, pedestrian, or obstacle, and is preferable for an on-vehicle system that controls a vehicle according to the distance information for the object 100. If LiDAR is used, a coaxial system or a non-coaxial system can be employed. In the coaxial system, the optical axes of the light source unit 10 and the light receiving unit 40 partially coincide with each other. In the non-coaxial system, the optical axes do not coincide with each other. The optical apparatus 1 according to the present exemplary embodiment includes the light guide unit 20, whereby the overall size of the apparatus is reduced and achieves a coaxial system.

Scratches and foreign objects existing in the passage region 2111 for the illumination light on the first surface 211 partly scatter the illumination light and causes scattering light to travel in the direction of an angle different from the angle of the desired illumination light. If this scattering light is incident on the light-receiving element 43 as unnecessary light, the distance measurement accuracy may possibly be degraded. A condition for preventing the scattering light generated in the passage region 2111 from being incident on the light-receiving element 43 will be discussed below.

More specifically, scattering light (unnecessary light) incident on the light-receiving element 43 is identified by tracing the optical path of the light traveling in the direction opposite to the traveling direction of the reflected light reflected by the reflective region 2122 on the second surface 212 (backward ray tracing). First, divergent light emitted from the light-receiving element 43 as a virtual light source (starting point) will be considered below. The divergent light emitted from the light-receiving element 43 as the starting point is changed to parallel light by the optical element 42, and reaches the second surface 212 via the optical filter 41. The light incident on the reflective region 2122 on the second surface 212 does not reach the passage region 2111 on the first surface 211, but the light incident on the transmissive region 2121 on the second surface 212 is refracted and reaches the passage region 2111.

More specifically, the optical path of the light that is emitted from the light-receiving element 43 and reaches the passage region 2111 on the first surface 211 can be considered as an inverse optical path of the optical path of the scattering light to be identified. Thus, when the transmissive region 2121 is projected onto the first surface 211 from the traveling direction of the light emitted from the light-receiving element 43 and refracted by the transmissive region 2121 (refraction angle to with respect to the transmissive region 2121), it is desirable that the projection region and the passage region 2111 do not overlap with each other. Since the light emitted from the light-receiving element 43 and refracted by the transmissive region 2121 does not reach the passage region 2111, scattering light caused by scratches and foreign objects in the passage region 2111 can be prevented from being received by the light-receiving element 43.

According to the present exemplary embodiment, the traveling direction of the illumination light incident on the passage region 2111 is parallel to the traveling direction of the reflected light reflected by the reflective region 2122. That is, the traveling directions are parallel to each other (Y-direction). More specifically, the light source unit 10 and the light receiving unit 40 according to the present exemplary embodiment are disposed so that the optical axes of the two units are parallel to each other. In this configuration, it is desirable to satisfy the following conditional expression (2):

$$t_s/h_1 > \sin(90° - \theta_2 - 2\theta_3)/(\cos\theta_1 * \sin 2\theta_3) \quad (2)$$

where $t_s$ denotes the minimum optical path length (shortest distance) of the illumination light from the passage region 2111 to the transmissive region 2121.

The conditional expression (2) indicates the condition for the shortest distance $t_s$ between the passage region 2111 and the transmissive region 2121, which prevents the overlapping of the passage region 2111 and the projection region on the first surface 211. Referring to FIG. 4, the distance between points A and B is the shortest distance $t_s$ between the passage region 2111 and transmissive region 2121. According to the present exemplary embodiment, $t_s = 4.77$ mm, the value of the left-hand side of the conditional expression (2), $t_s/h_1$, is 3.67, and the value of the right-hand side thereof is 3.56, which satisfy the conditional expression (2). According to the present exemplary embodiment, this projection region is used as the above-described total reflection region 2112.

It is desirable that the light source 11 is disposed so that the x axis illustrated in FIG. 3 coincides with the Z axis illustrated in FIG. 1, and the y axis illustrated in FIG. 3 coincides with the X axis illustrated in FIG. 1. Disposing the light source 11 in this way enables changing the illumination light incident on the passage region 2111 on the first surface 211 to P-polarized light with the electric field oscillating in the YZ cross-section.

Figure 5:
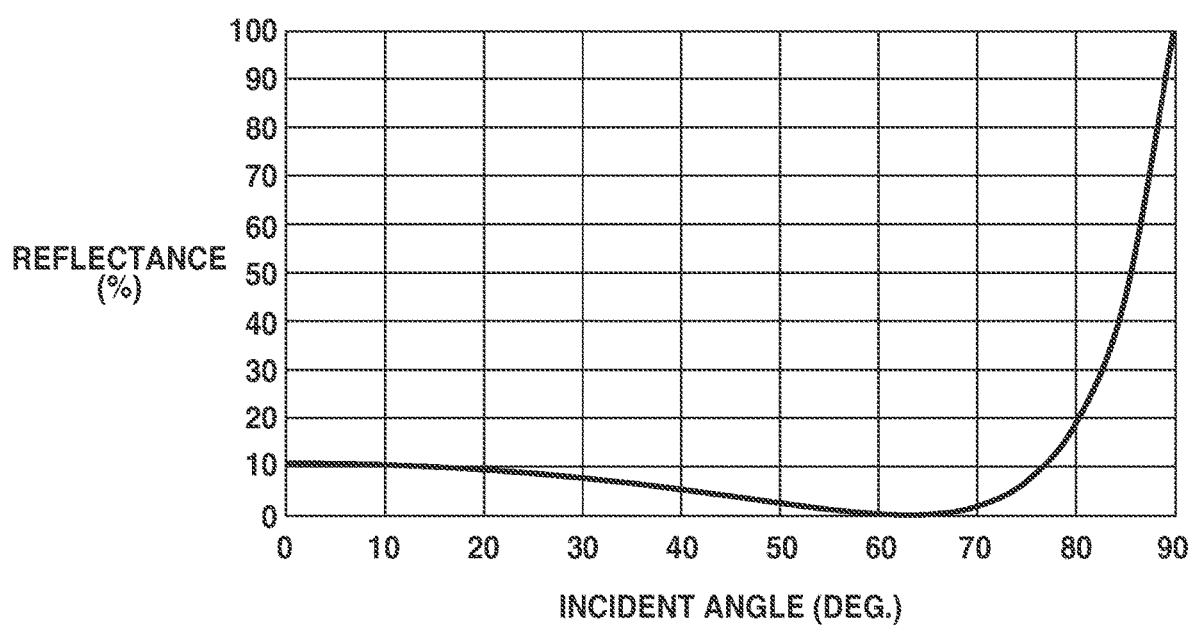
FIG. 5 illustrates a relation between an incident angle and a reflectance for P-polarized light with respect to the light guide unit according to the first exemplary embodiment.

FIG. 5 illustrates the relation between the incident angle and the reflectance of the P-polarized light with respect to the first surface 211 according to the present exemplary embodiment. The reflectance of the P-polarized light on the first surface 211 decreases with increasing incident angle with respect to the first surface 211 from 0°. Once the reflectance decreases to 0, the reflectance increases. The incident angle when the reflectance of the P-polarized light becomes 0 is referred to as Brewster's angle. Brewster's angle $\theta_B$ is represented by the following Formula (3):

$$\theta_B = \tan^{-1}(N'/N) \quad (3)$$

where N denotes the refractive index of the P-polarized light for the incident medium, and N' denotes the refractive index thereof for the light emitting medium.

By making the illumination light incident on the first surface 211 at an incident angle close to Brewster's angle $\theta_B$, the reflectance of the passage region 2111 on the first surface 211 can be reduced without using an antireflection film. This enables the illumination light to enter the branching optical element 21 with a high efficiency in a simple configuration. Therefore, it is desirable that the branching optical element 21 satisfies the following conditional expression (4):

$$-10 < \theta_B - \theta_1 < 10 \quad (4)$$

According to the present exemplary embodiment, Brewster's angle for the material of the branching optical element 21 is 63.1°, resulting in $\theta_B - \theta_1 = -6.3°$ which satisfies the conditional expression (4). Further, it is more desirable that the following conditional expressions (4a) and (4b) are satisfied in this order.

$$-8.5 < \theta_B - \theta_1 < 8.5 \quad (4a)$$

$$-7.5 < \theta_B - \theta_1 < 7.5 \quad (4b)$$

The optical apparatus 1 according to the present exemplary embodiment enables preventing the generation of unnecessary light even with a simple configuration.

Second Exemplary Embodiment

Figure 6:
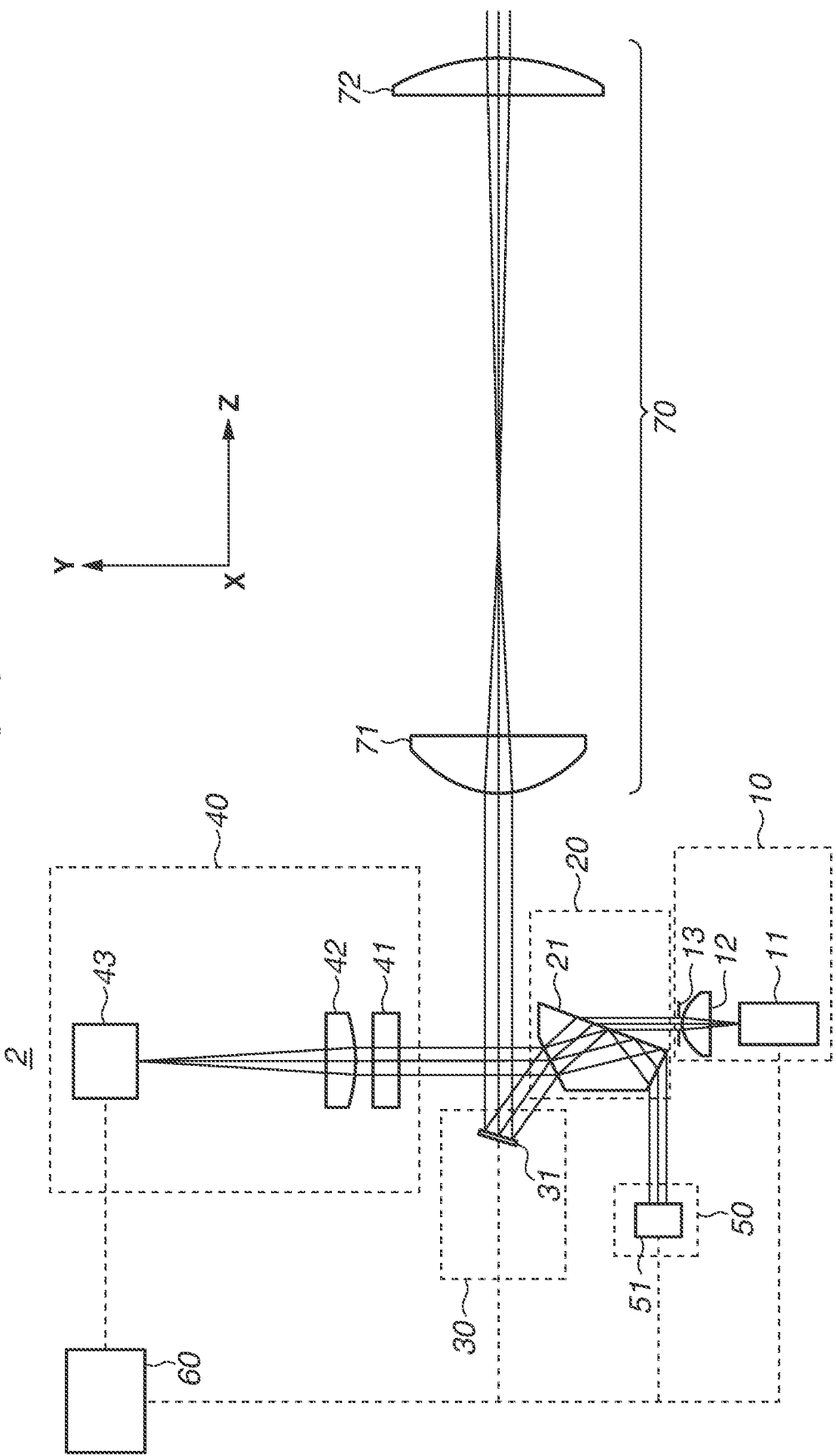
FIG. 6 schematically illustrates a main portion of an optical apparatus according to a second exemplary embodiment.

FIG. 6 schematically illustrates a main portion of an optical apparatus 2, in a cross-section (YZ cross-section) including the optical axis, according to a second exemplary embodiment of the present invention. The optical apparatus 2 according to the second exemplary embodiment differs from the optical apparatus 1 according to the first exemplary embodiment in that an optical system 70 is disposed between the deflection unit 30 and an object (not illustrated). Other components are similar to those of the optical apparatus 1 according to the first exemplary embodiment, and redundant descriptions thereof will be omitted.

The optical system 70 is an optical system (telescope) that enlarges the diameter of the illumination light from the deflection unit 30 and reduces the diameter of the reflected light from the object. The optical system 70 according to the present exemplary embodiment includes a plurality of optical elements (lenses) having refractive power, and is an a focal system not having refractive power in the overall system. More specifically, the optical system 70 includes a first lens 71 having positive power and a second lens 72 having positive power which are sequentially disposed from the side of the deflection unit 30 to the side of the object. The configuration of the optical system 70 is not limited thereto and may include three or more lenses as required.

A drive mirror 31 according to the present exemplary embodiment is disposed at the position of the incidence pupil of the optical system 70. The absolute value of the optical magnification (horizontal magnification) β of the optical system 70 according to the present exemplary embodiment is larger than 1 (|β|>1). The deflection angle of the principal ray of the illumination light emitted from the optical system 70 is smaller than the deflection angle of the principal ray of the illumination light deflected by the drive mirror 31 and incident on the optical system 70, making it possible to improve the resolution at the time of object detection.

The illumination light from the light source unit 10 is deflected by the deflection unit 30 via the light guide unit 20 and then enlarged according to the optical magnification β by the optical system 70 before illuminating the object. The reflected light from the object is reduced by optical system 70 in accordance with the optical magnification 1/β and then deflected by the deflection unit 30 before reaching the light receiving unit 40.

Disposing the optical system 70 on the object side of the deflection unit 30 in this way enables the diameter of the illumination light to be enlarged not only by the light guide unit 20 but also by the optical system 70. This makes it possible to reduce the spread angle by further extending the diameter of the illumination light, thus ensuring sufficient illuminance and resolution even when the object is far away. Extending the pupil diameter by the optical system 70 enables receiving a larger quantity of reflected light from the object, thus improving the distance measurement distance and distance measurement accuracy.

Third Exemplary Embodiment

Figure 7:
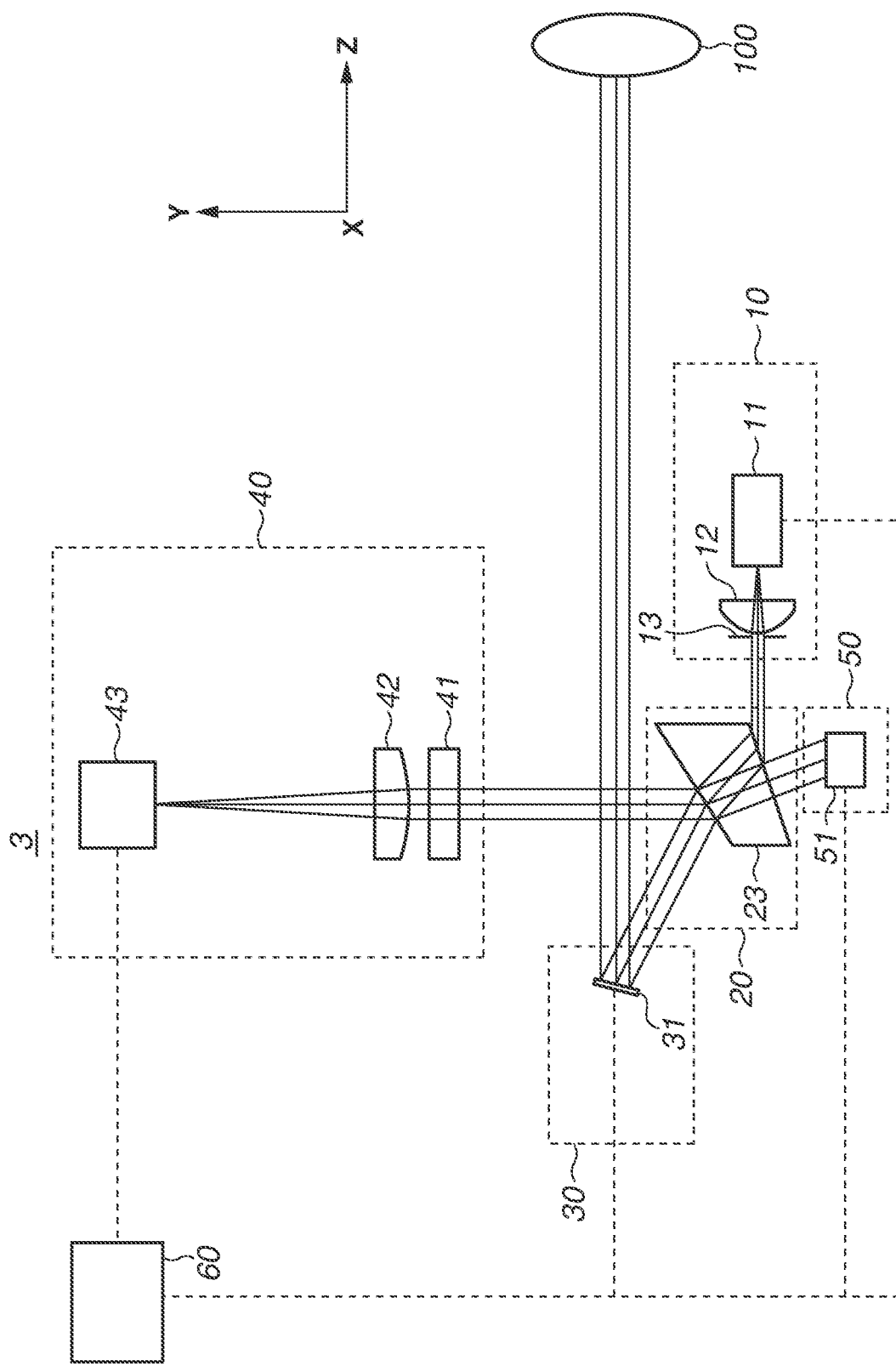
FIG. 7 schematically illustrates a main portion of an optical apparatus according to a third exemplary embodiment.
Figure 8:
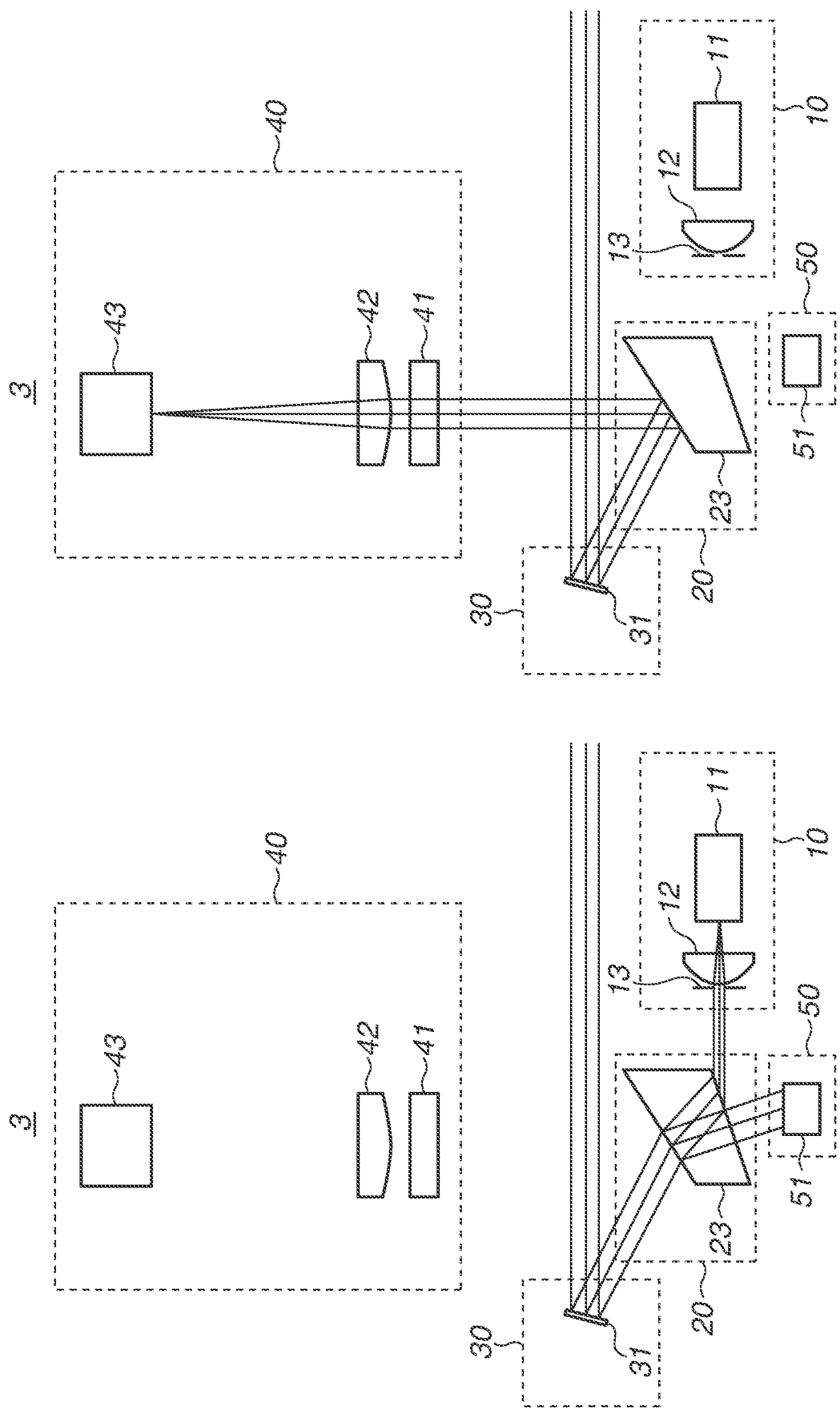
FIG. 8 illustrates optical paths of illumination light and reflected light in the optical apparatus according to the third exemplary embodiment.

FIG. 7 schematically illustrates a main portion of an optical apparatus 3, in a cross-section (YZ cross-section) including the optical axis, according to a third exemplary embodiment of the present invention. FIG. 8 illustrates optical paths in the optical apparatus 3, including an optical path along which the illumination light from the light source unit 10 travels toward the object 100 and an optical path along which the reflected light from the object 100 travels toward the light receiving unit 40. The optical apparatus 3 according to the third exemplary embodiment differs from the optical apparatus 1 according to the first exemplary embodiment in the configuration of the light guide unit 20 and the layout of the light source unit 10 and the light receiving unit for light source 50. Other components are similar to those of the optical apparatus 1 according to the first exemplary embodiment, and redundant descriptions thereof will be omitted.

The light guide unit 20 according to the present exemplary embodiment includes a branching optical element 23 having a shape different from that of the branching optical element 21 according to the first exemplary embodiment. The optical apparatus 3 according to the present exemplary embodiment differs from the optical apparatus 1 according to the first exemplary embodiment in that the traveling direction (Z-direction) of the illumination light entering the light guide unit 20 from the light source unit 10 is perpendicular to the traveling direction (Y-direction) of the reflected light reflected by the light guide unit 20. More specifically, the light source unit 10 and the light receiving unit 40 according to the present exemplary embodiment are disposed so that the optical axes of the two units are perpendicular to each other.

FIG. 9 schematically illustrates a main portion of the branching optical element 23 according to the present exemplary embodiment. The branching optical element 23 has a first surface 231 and a second surface 232. FIG. 9 illustrates a cross-section (YZ cross-section) perpendicular to each optical surface of the branching optical element 23, and the second surface 232 thereof viewed from the normal direction. According to the present exemplary embodiment, an angle $\alpha_1$ (not illustrated) formed by the first surface 231 and the second surface 232 in the YZ cross-section is 12.7°.

The illumination light that passed through the opening of the diaphragm 13 enters the branching optical element 23 from the first surface 231, reaches the second surface 232 without passing through other surfaces, penetrates the transmissive region 2321, and travels toward the deflection unit 30. According to the present exemplary embodiment, $h_1=1.30$ mm, $h_2=2.95$ mm, $\theta_1=70.2°$, $\theta_2=28.5°$, $\theta_3=15.8°$, and $\theta_4=32.5°$, and the values on both sides of Formula (1) are 2.27. The illumination light is enlarged by the first surface 231 and the second surface 232. Part of the illumination light from the first surface 231 does not penetrate but reflects off the transmissive region 2321, penetrates the transmissive region 2312 on the first surface 231, exits the branching optical element 23, and is incident on the light receiving unit for light source 50.

Like the first exemplary embodiment, a condition for preventing the scattering light generated in the passage region 2311 on the first surface 231 from being incident on the light-receiving element 43 will be discussed. According to the present exemplary embodiment, the traveling direction of the illumination light incident on the passage region 2311 and the traveling direction of the reflected light reflected by the reflective region 2322 are perpendicular to each other. In this configuration, it is desirable that the following conditional expression (5) is satisfied:

$$t_1/h_1 > \sin(90°+\theta_2-2\theta_3)/(\cos\theta_1 * \sin 2\theta_3) \quad (5)$$

where $t_1$ denotes the maximum optical path length (longest distance) of the illumination light from the passage region 2311 to the transmissive region 2321.

Like the conditional expression (2), the conditional expression (5) indicates a condition for preventing the projection region formed by projecting the transmissive region 2321 onto the first surface 231 at a refraction angle ω from overlapping with the passage region 2311. Referring to FIG. 9, the distance between points A and B is the longest distance $t_1$ between the passage region 2311 and the transmissive region 2321. According to the present exemplary embodiment, $t_1=7.61$ mm, the value of the left-hand side of the conditional expression (5), $t_1/h_1$, is 5.85, and the value of the right-hand side thereof is 5.63, which satisfy the conditional expression (5). According to the present exemplary embodiment, the projection region is used as the above-described transmissive region 2312.

It is desirable that the light source 11 is disposed so that the x axis illustrated in FIG. 3 coincides with the Y axis illustrated in FIG. 7, and the y axis illustrated in FIG. 3 coincides with the X axis illustrated in FIG. 7. Like the first exemplary embodiment, disposing the light source 11 in this way enables changing the illumination light incident on the passage region 2311 on the first surface 231 to P-polarized light with the electric field oscillating in the YZ cross-section. According to the present exemplary embodiment, Brewster's angle for the material of the branching optical element 23 is 63.1°, and hence $\theta_B-\theta_1=-7.1°$, which satisfies the conditional expression (4).

Thus, using the branching optical element 23 according to the present exemplary embodiment enables preventing the generation of unnecessary light while simplifying the overall apparatus even in the configuration in which the optical axes of the light source unit 10 and the light receiving unit 40 are perpendicular to each other. Like the second exemplary embodiment, an optical system (telescope) may also be disposed on the object side of the deflection unit 30 according to the present exemplary embodiment.

Table 1 indicates values related to the above-described formulas according to each exemplary embodiment.

TABLE 1

|  | First and second exemplary embodiments | | Third exemplary embodiment | |
| --- | --- | --- | --- | --- |
| Formula (1) | 2.28 | | 2.27 | |
| Formula (2) | Left-hand side | 3.67 | — | |
|  | Right-hand side | 3.56 | | |
| Formula (3) | 63.11 | | 63.11 | |
| Formula (4) | −6.29 | | −7.09 | |
| Formula (5) | — | | Left-hand side | 5.85 |
|  | | | Right-hand side | 5.63 |

[On-Vehicle System]

Figure 10:
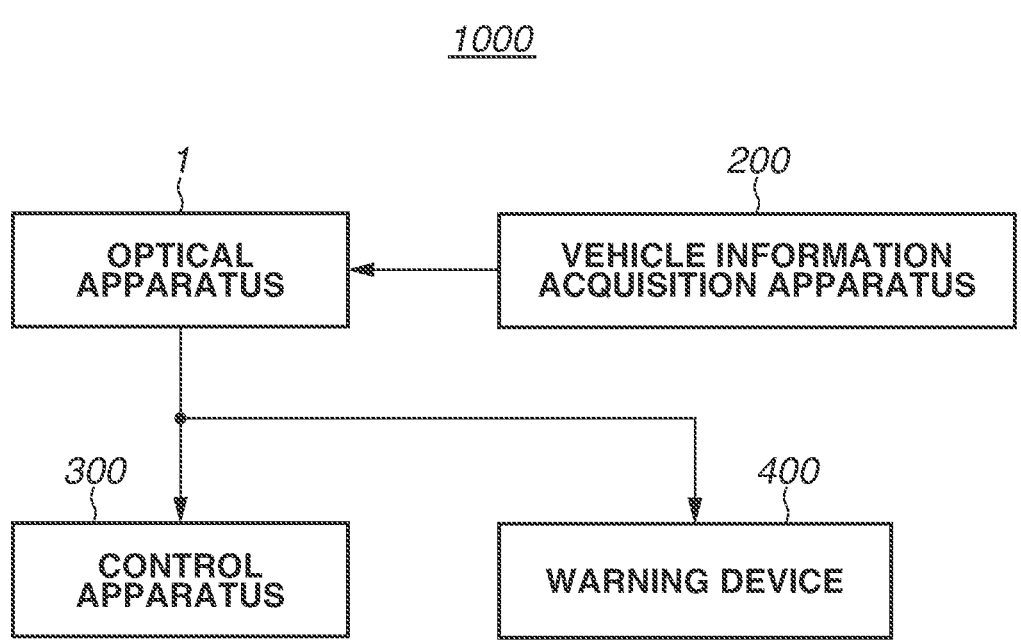
FIG. 10 is a function block diagram illustrating an on-vehicle system according to an exemplary embodiment.
Figure 11:
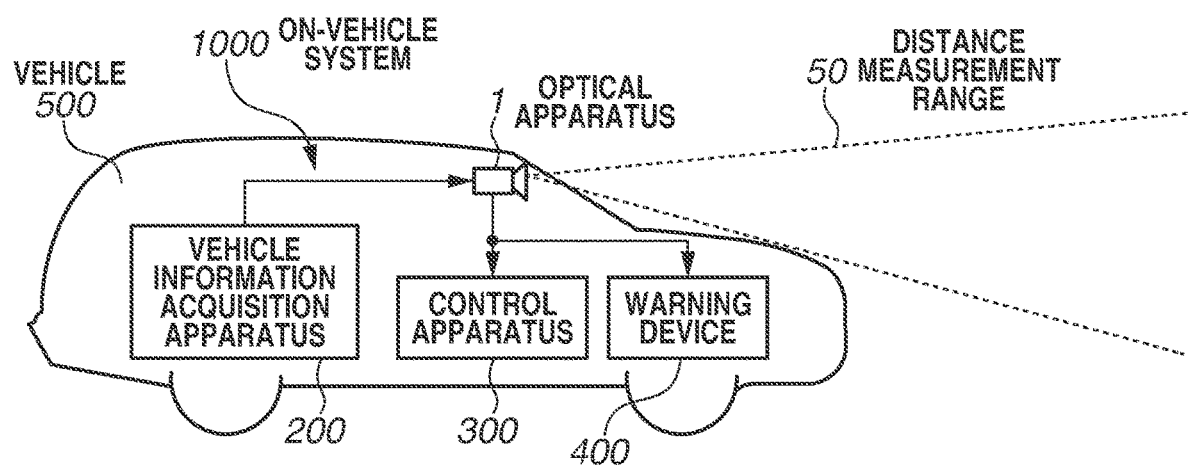
FIG. 11 schematically illustrates a vehicle (moving apparatus) according to the exemplary embodiment.

FIG. 10 illustrates the optical apparatus 1 and a configuration of an on-vehicle system (driving assistance apparatus) 1000 including the optical apparatus 1 according to the present exemplary embodiment. The on-vehicle system 1000 supported by a moving body (moving apparatus), such as an automobile (vehicle), is an apparatus for assisting the driving (control) of the vehicle based on distance information of objects such as obstacles and passengers acquired by the optical apparatus 1. FIG. 11 schematically illustrates a vehicle 500 including the on-vehicle system 1000. FIG. 11 illustrates a case where the distance measurement range (detection range) of the optical apparatus 1 is set on the anterior side of the vehicle 500. However, the distance measurement range may be set on the posterior or lateral side of the vehicle 500.

As illustrated in FIG. 10, the on-vehicle system 1000 includes the optical apparatus 1, a vehicle information acquisition apparatus 200, a control apparatus (electronic control unit (ECU)) 300, and a warning device 400. In the on-vehicle system 1000, the control unit 60 included in the optical apparatus 1 has functions of a distance acquisition unit (acquisition unit) and a collision determination unit (determination unit). However, if necessary, the on-vehicle system 1000 may include the distance acquisition unit and the collision determination unit as different units from the control unit 60. These units may be provided outside the optical apparatus 1 (e.g., inside the vehicle 500). Alternatively, the control apparatus 300 may be used as the control unit 60.

Figure 12:
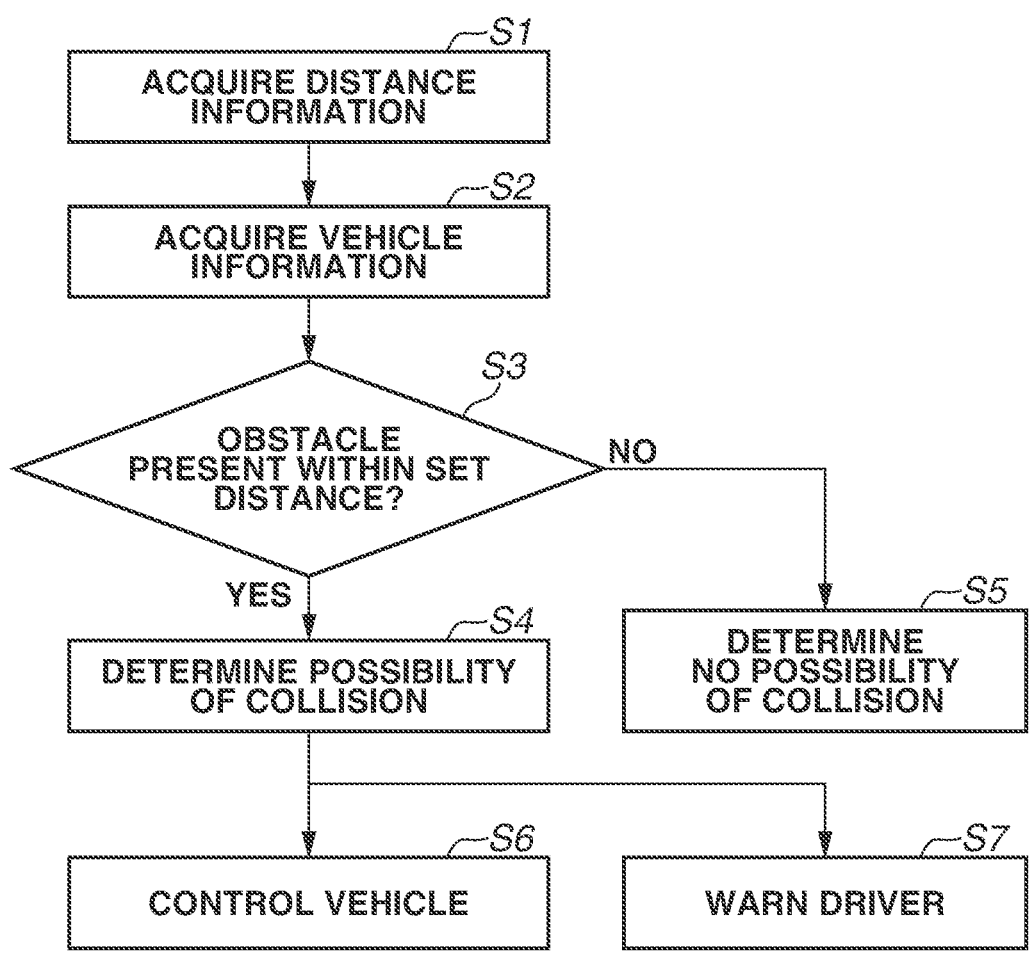
FIG. 12 is a flowchart illustrating an example of an operation of the on-vehicle system according to the exemplary embodiment.

FIG. 12 is a flowchart illustrating an example of an operation of the on-vehicle system 1000 according to the present exemplary embodiment. Operations of the on-vehicle system 1000 will be described below with reference to the flowchart.

In step S1, an object around the vehicle is illuminated by the light source unit 10 of the optical apparatus 1, and based on a signal output by the light receiving unit 40 in response to reception of reflected light from the object, distance information of the object is acquired by the control unit 60. In step S2, the vehicle information acquisition apparatus 200 acquires vehicle information including the vehicle speed, yaw rate, and steering angle of the vehicle. In step S3, using the distance information acquired in step S1 by the control unit 60 and the vehicle information acquired in step S2, it is determined whether the distance to the object falls within a preset range of a set distance.

This makes it possible to determine whether an object exists within the set distance around the vehicle to determine the possibility of a collision between the vehicle and the object. Steps S1 and S2 may be performed in reverse order of the above-described order, or performed in parallel. In a case where an object exists within the set distance, then, in step S4, the control unit 60 determines that "there is a possibility of a collision". On the other hand, in a case where no object exists within the set distance, then in step S5, the control unit 60 determines that "there is no possibility of a collision".

In a case where the control unit 60 determines that "there is a possibility of a collision", the control unit 60 notifies the control apparatus 300 and the warning device 400 of the determination result (transmits the determination result thereto). In step S6, the control apparatus 300 controls the vehicle based on the determination result by the control unit 60. In step S7, the warning device 400 warns the user (driver) of the vehicle based on the determination result by the control unit 60. At least either one of the control apparatus 300 and the warning device 400 needs to be notified of the determination result.

The control apparatus 300 performs controls including applying the brakes, releasing the accelerator, turning the steering wheel, and generating control signals for generating a braking force in each wheel to restrain the power of the engine and motor. The warning device 400 warns the driver by generating an alarm sound, displaying alarm information on the screen of a car navigation system, and applying vibration to the seat belt or steering wheel.

The on-vehicle system 1000 according to the present exemplary embodiment is capable of performing object detection and distance measurement through the above-described processing, making it possible to avoid a collision between the vehicle and an object. In particular, applying the optical apparatus 1 according to each exemplary embodiment to the on-vehicle system 1000 enables achieving a high distance measurement accuracy, making it possible to perform object detection and collision determination at a high accuracy.

Although, in the present exemplary embodiment, the on-vehicle system 1000 is applied to driving assistance (collision damage reduction), the present invention is not limited thereto. The on-vehicle system 1000 may be applied to cruise control (including full speed range adaptive cruise control function) and automatic driving control. The on-vehicle system 1000 is applicable not only to vehicles such as automobiles but also to moving bodies such as boats and ships, aircrafts, and industrial robots. In addition, the on-vehicle system 1000 is applicable not only to moving bodies but also to Intelligent Transport Systems (ITS), monitoring systems, and other various apparatuses utilizing object recognition.

Modifications

While the present invention has specifically been described based on the above-described preferred exemplary embodiments, the present invention is not limited thereto but can be combined, modified, and changed in diverse ways within the subject matter of the present invention.

For example, if necessary, another optical element may be disposed in the optical path between the light guide unit 20 (second surface) and the deflection unit 30. However, to favorably restrict the generation of the above-described unnecessary light, it is desirable that nothing is disposed in the optical path between the light guide unit 20 and the deflection unit 30 as in each of the above-described exemplary embodiments. In other words, it is desirable to employ a configuration in which the illumination light from the second surface is incident on the drive mirror 31 without passing through other surfaces.

Although, in each exemplary embodiment, each member is integrally formed (integrally held), each member may be configured as a separate member. For example, the light source unit 10 and the light receiving unit 40 may be attachable to and detachable from the light guide unit 20 or the deflection unit 30. In this case, the holding member (housing) for holding each member needs to be provided with a connecting portion (binding portion) for connection with each other. To improve the positioning accuracy between the light source unit 10 and the light guide unit 20, a diaphragm 13 may be provided in the light guide unit 20 and held by a holding member commonly used for the branching optical element.

Although, in each exemplary embodiment, the light guide unit 20 includes a single branching optical element, the light guide unit 20 may include a plurality of optical elements as required. For example, a refractive optical element may be provided between the branching optical element and the light source unit 10 and between the branching optical element and the light receiving unit for light source 50. The reflective region on the second surface of the branching optical element may be provided as another reflection optical element. However, it is desirable that the light guide unit 20 includes a single branching optical element to simplify the overall apparatus and reduce unnecessary light.

The present invention is not limited to the above-described exemplary embodiments but can be modified and changed in diverse ways without departing from the spirit and scope thereof. Therefore, the following claims are appended to disclose the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An optical apparatus comprising:
    deflector configured to deflect illumination light from a light source to scan an object and deflect reflected light from the object; and
    a light guide configured to guide the illumination light from the light source to the deflector and guide the reflected light from the deflector to a first sensor,
    wherein the light guide includes a first surface on which the illumination light from the light source is incident and a second surface including a transmissive region through which the illumination light from the first surface is transmitted and a reflective region that reflects the reflected light from the deflector,
    wherein the first and the second surfaces are non-parallel to each other, and
    wherein the illumination light from the first surface is incident on the transmissive region without passing through other surfaces, and the illumination light from the transmissive region is incident on the deflector without passing through other surfaces.

2. The optical apparatus according to claim 1, wherein, when light traveling in a direction opposite to a traveling direction of the reflected light reflected by the reflective region is incident on the transmissive region, the light refracted by the transmissive region is not incident on a passage region for the illumination light on the first surface.

3. The optical apparatus according to claim 1, wherein the traveling direction of the illumination light incident on the first surface and the traveling direction of the reflected light reflected by the reflective region are parallel to each other.

4. The optical apparatus according to claim 3, wherein, in a cross-section perpendicular to the first and the second surfaces, the following conditional expression is satisfied:

$$t_s/h_1 > \sin(90° - \theta_2 - 2\theta_3)/(\cos\theta_1 * \sin 2\theta_3)$$

where $t_s$ denotes a minimum optical path length of the illumination light from the first surface to the transmissive region, $h_1$ denotes the diameter of the illumination light incident on the first surface, $\theta_1$ [°] denotes an incident angle of the illumination light with respect to the first surface, $\theta_2$ [°] denotes an refraction angle of the illumination light with respect to the first surface, and $\theta_3$ [°] denotes the incident angle of the illumination light with respect to the transmissive region.

5. The optical apparatus according to claim 1, wherein the traveling direction of the illumination light incident on the first surface and the traveling direction of the reflected light reflected by the reflective region are perpendicular to each other.

6. The optical apparatus according to claim 5, wherein, in a cross-section perpendicular to the first and the second surfaces, the following conditional expression is satisfied:

$$t_1/h_1 > \sin(90° + \theta_2 - 2\theta_3)/(\cos\theta_1 * \sin 2\theta_3)$$

where $t_1$ denotes a maximum optical path length of the illumination light from the first surface to the transmissive region, $h_1$ denotes the diameter of the illumination light incident on the first surface, $\theta_1$ [°] denotes the incident angle of the illumination light with respect to the first surface, $\theta_2$ [°] denotes the refraction angle of the illumination light with respect to the first surface, and $\theta_3$ [°] denotes the incident angle of the illumination light with respect to the transmissive region.

7. The optical apparatus according to claim 1, wherein, in a cross-section perpendicular to the first and the second surfaces, the diameter of the illumination light emitted from the transmissive region is larger than the diameter of the illumination light incident on the first surface.

8. The optical apparatus according to claim 1, wherein a part of the illumination light from the first surface is reflected by the transmissive region, and the light guide has a third surface on which the part of the illumination light reflected by the transmissive region is incident.

9. The optical apparatus according to claim 8, wherein the first surface reflects the light reflected by the transmissive region, to guide the light to the third surface.

10. The optical apparatus according to claim 1, further comprising a second sensor for light source configured to receive the light reflected by the transmissive region.

11. The optical apparatus according to claim 1, wherein, in a cross-section perpendicular to the first and the second surfaces, the following conditional expression is satisfied:

$$-10 < \theta_B - \theta_1 < 10$$

where $\theta_1$ [°] denotes the incident angle of the illumination light with respect to the first surface, and $\theta_B$ [°] denotes Brewster's angle on the first surface.

12. The optical apparatus according to claim 1, wherein a shape of the transmissive region is an ellipse.

13. The optical apparatus according to claim 1, wherein the light guide includes a single optical element.

14. The optical apparatus according to claim 13, wherein the refraction index of the material of the optical element with respect to a 905 nm wavelength is 1.70 or higher.

15. The optical apparatus according to claim 1, further comprising an optical system configured to enlarge the diameter of the illumination light from the deflector and reduce the diameter of the reflected light from the object.

16. The optical apparatus according to claim 1, further comprising a control unit configured to acquire distance information of the object based on an output of the first sensor.

17. An on-vehicle system comprising the optical apparatus according to claim 1, wherein a possibility of a collision between a vehicle and the object is determined based on the distance information of the object obtained by the optical apparatus.

18. A moving body comprising the optical apparatus according to claim 1, wherein the moving body is movable while holding the optical apparatus.

19. An optical apparatus comprising:
a deflector configured to deflect illumination light from a light source to scan an object and deflect reflected light from the object; and
a light guide configured to guide the illumination light from the light source to the deflector and guide the reflected light from the deflector to a first sensor,
wherein the light guide includes a first surface on which the illumination light from the light source is incident and a second surface including a transmissive region through which the illumination light from the first surface is transmitted and a reflective region that reflects the reflected light from the deflector,
wherein the first and the second surfaces are non-parallel to each other,
wherein the illumination light from the first surface is incident on the transmissive region without passing through other surfaces,
wherein the traveling direction of the illumination light incident on the first surface and the traveling direction of the reflected light reflected by the reflective region are parallel to each other, and
wherein, in a cross-section perpendicular to the first and the second surfaces, the following conditional expression is satisfied:

$$t_s/h1 > \sin(90° - \theta_2 - 2\theta_3)/(\cos\theta_1 * \sin 2\theta_3)$$

where $t_s$ denotes a minimum optical path length of the illumination light from the first surface to the transmissive region, h1 denotes the diameter of the illumination light incident on the first surface, $\theta_1$ [°] denotes an incident angle of the illumination light with respect to the first surface, $\theta_2$ [°] denotes an refraction angle of the illumination light with respect to the first surface, and $\theta_3$ [°] denotes the incident angle of the illumination light with respect to the transmissive region.

20. An optical apparatus comprising:
a deflector configured to deflect illumination light from a light source to scan an object and deflect reflected light from the object; and
a light guide configured to guide the illumination light from the light source to the deflector and guide the reflected light from the deflector to a first sensor,
wherein the light guide includes a first surface on which the illumination light from the light source is incident and a second surface including a transmissive region through which the illumination light from the first surface is transmitted and a reflective region that reflects the reflected light from the deflector,
wherein the first and the second surfaces are non-parallel to each other,
wherein the illumination light from the first surface is incident on the transmissive region without passing through other surfaces,
wherein the traveling direction of the illumination light incident on the first surface and the traveling direction of the reflected light reflected by the reflective region are perpendicular to each other, and
wherein, in a cross-section perpendicular to the first and the second surfaces, the following conditional expression is satisfied:

$$t_1/h_1 > \sin(90° + \theta_2 - 2\theta_3)/(\cos\theta_1 * \sin 2\theta_3)$$

where $t_1$ denotes a maximum optical path length of the illumination light from the first surface to the transmissive region, $h_1$ denotes the diameter of the illumination light incident on the first surface, $\theta_1$ [°] denotes the incident angle of the illumination light with respect to the first surface, $\theta_2$ [°] denotes the refraction angle of the illumination light with respect to the first surface, and $\theta_3$ [°] denotes the incident angle of the illumination light with respect to the transmissive region.

* * * * *